Sept. 6, 1966  G. WETZEL ETAL  3,270,651
METHOD OF COPYING CINEMATOGRAPH FILMS IN COLOUR
OR BLACK AND WHITE
Filed Aug. 7, 1962

Inventors:
GÜNTER WETZEL and GÜNTER
FEILER
BY: McGlew and Toren
Attorneys

3,270,651
METHOD OF COPYING CINEMATOGRAPH FILMS IN COLOUR OR BLACK AND WHITE
Günter Wetzel, Berlin-Steglitz, and Günter Feiler, Berlin-Lankwitz, Germany, assignors to Union Tonfilmmaschinenbau-Gesellschaft mit beschrankter Haftung, Berlin, Germany
Filed Aug. 7, 1962, Ser. No. 215,395
Claims priority, application Germany, Aug. 11, 1961, U 8,252
1 Claim. (Cl. 95—75)

The invention relates to a method and apparatus for copying cinematographic films in colour or black-and-white. Cinematographic films, such as acted films, newsreels, cultural films, advertising films, and the like, consist of different successive scenes, photographed under different conditions and lighting, so that the colour and the light values are not uniform, and that during copying the light values of the black-and-white film and in addition the colour values of the colour film must be balanced. The two known copying methods effect this balancing in different ways.

One method effects the copying by means of the step-by-step method which is also used for ordinary projection. Here, the film is moved intermittently, using usually a Maltese Cross arrangement, because the advancing speed rises slowly from minimum to maximum speed in the centre and then declines again. Also, with this copying method, the film is moved intermittently. The copying is effected with stationary film and during the transport of the film by the Maltese Cross movement or the like, the flow of light is masked by a shutter. In order to control the light values, a control tape is used, adapting the light density affecting the film, either by changing the light flux cross-section, or by means of filters. The colour values are controlled subtractively by positioning colour filters in the light path. The colour filters, necessary to control the light values, are arranged on the control tape controlling the light intensity. The control tape may be a so-called aperture tape consisting of opaque material and having apertures of different sizes coordinated to the individual scenes of the film to be copied, and controlling the light intensity affecting successive scenes, in order to effect a balance. The colour filters are here associated with the apertures. Each aperture of the tape is coordinated to one scene so that a change of the scene requires a movement of the aperture tape to the next aperture. This movement is very simple with the feeder system, because it may be effected during the interruption of the light flux by the rotating masking element so that the flow of light necessary for copying the film is not affected.

Also the subtractive colour control is simple and requires no special installation, apart from the necessary colour filters. The opaque aperture tape may also be replaced by a transparent control tape. This control tape consists of a transparent carrier with pockets for holding grey filters, affecting the light intensity. The function of this control tape is the same as with opaque aperture tapes. This transparent control tape is less suitable for colour films, because the transparent carrier may cause falsification of the colour. For this reason, transparent control tapes are not usually used for copying colour film. Where they are used, the required colour filters are fitted additionally in the pockets holding the intensity control grey filters. The advantage of this copying method is the reliable and simple control of the light intensity and colour value by simple and reliable means, without affecting the copying light, because the movement of the control tape with scene changes necessitating an interruption of the light is effected when the copying light is shuttered by the rotating mask. The disadvantage of this copying method is its slow operating speed, caused by the intermittent movement of the film, and making impossible a further increase in the speed. The maximum operating speed for copying according to this method is about 16–18 frames per second.

The other known copying method uses a continuous copying machine. Here, the film runs at continuous speed through the machine without interruption of the light flux. With this method, the light flux must not be interrupted, because with continuously moving film strip, this would result in undesirable changes in the exposure. For this reason, control tapes, as mentioned above, cannot be used. With continuous copying machines, the intensity of the copying light is changed by varying the intensity of the light source itself, for example, by changing the value of a resistance connected in series with the light source.

Although this method may be satisfactory for black-and-white photography, it has a disadvantage for copying colour films in that the change of the light source intensity causes changes in the colour temperature of the copying light and thus colour falsification. For this reason, this method is generally rejected for colour films. The control of the colour values cannot, with this method, be effected subtractively as with the Maltese Cross movement, but must be effected additively. To this end, there is arranged a tripartite red-blue-green filter in the light path with three masks which must be controlled simultaneously and independently for correctly adjusting the colour values. This control is very complicated and structurally very expensive. With new machines, it is usually effected by electronic means. The disadvantage of this method is the complicated and expensive construction and the necessary preliminary work. The advantages are a considerably higher operating speed of about 30 frames per second.

There have already been attempts to use a control tape with a continuous copying machine in order to obtain the advantages of both machines whilst avoiding their disadvantages. Hitherto, these attempts were unsuccessful, because when advancing the control tape with continuously running film and with interrupted light flow, there are formed, with every scene change, on at least two successive frames, changes in the light and colour values which appear as light flashes during the projection of the film. Especially undesirable are these light flashes with the use of an aperture control tape, the actuation of which causes the light to be masked completely. When this system is used, the affected individual frames must be cut from the film and this affects in turn the sound reproduction. For this reason, it has hitherto been necessary to use the Maltese Cross system for subtractive control, or the continuous copying method for additive control.

The present invention avoids the drawbacks of both known systems and uses its advantages. This is achieved in that the film is copied in a continuous copying machine with constant light source, with subtractive colour light and intensity control by means of a control tape moved through the light path, whereby on the film an interruption of the light path caused by an opaque control tape or an appreciable change of the light flux with a transparent light tape is prevented by optical means. The applicants have found that light flashes during the reproduction may be prevented and that a perfectly projectable film may be copied if the method of the invention is used.

According to a further feature of the method the movement of the control tape is so effected that, during the passage of the web between two control zones through the centre of the light beam cross-section, the dividing line between two frames of the film passes the copying slot. Because this dividing line of about 3 mm. width is equal during its passage through the copying slot to the interruption of the light flux, it is particularly advantageous that the web centre which affects the light flux most and moves at maximum velocity, should pass the centre of the beam cross-section at the same time as the frame intersection passes the copying slot.

The apparatus for carrying out this method is characterized in that the optical means comprise a rectangular light aperture, coordinated with the control tape, with a connected collector lens and a light guide terminating at the copying slot, by means of which the entire light passing through the light aperture and collected by the lens is focussed on the copying slot. Thus, an interruption of the light during the movement of the control tape is avoided. During the movement of the control tape, one control field leaves the light aperture. The successive control field or zone enters from above into the light aperture so that during the movement, there are always two control fields within the range of the light aperture, causing a continuous light flow, focussed by the lens and transmitted by the light guide, extending to the copying slot, and applying the entire light quantity coming from the light aperture to the copying slot. In order to restrict the passage of the web centre of the control tape through the centre of the light beam cross-section, to the frame intersection, the light outlet of the light guide across the copying slot is such that its width corresponds substantially to the width of the frame intersection. In this way, the passage of the web centre through the centre of the light flux coincides in fact completely with the frame intersection and has no disadvantageous effects.

When using, especially for colour films, an opaque control tape, the width of the light aperture is substantially equal to the centre distance between two control apertures. In this way, when during the advance of the control tape, one aperture is completely or two apertures are partly within the zone of the light passage, and light will always pass through the light passage, and be focussed by the lens into the light guide. The arrangement of lens and light guide serves to apply the entire light quantity passing through the light aperture to the copying slot without losses. In order to provide a substantially uniform amount of light over the entire surface of the light passage, the spiral of the light source is adapted to the shape of the light passage.

The invention will be further described, by way of example, with reference to the accompanying drawings, in which.

Figure 1:
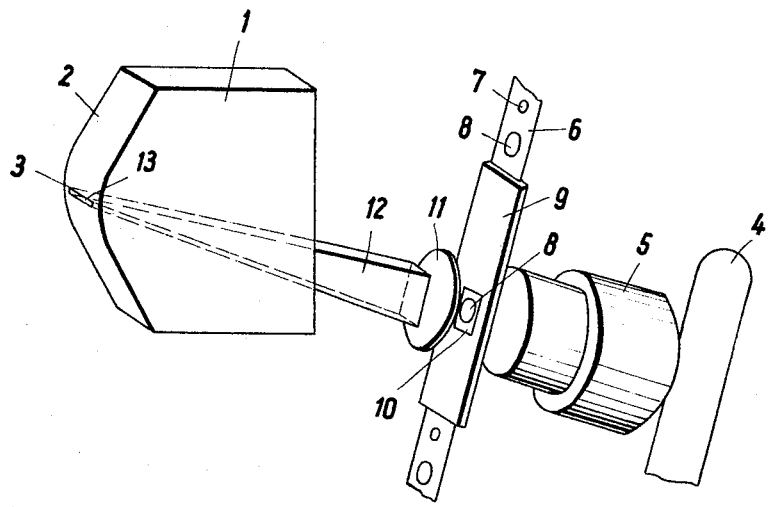
FIG. 1 is a diagrammatic perspective representation of the optical arrangement for carrying out the method of the invention.

FIG. 1 shows diagrammatically the apparatus required for carrying out the method of the invention. The continuous copying machine is not shown. The drawing shows the copying frame 1 of the continuous machine, having on its front side the actual copying track 2, over which runs a negative film and a positive film at a uniform speed of about 30 frames per second. In the track 2, there is a copying slot 3, having usually a width of about 6 mm. The light required for the copying is produced by a lamp 4. The light issuing from the lamp 4 is projected by a condenser 5 on to the aperture tape 6, having differential apertures 7, 8. The aperture tape 6 is located in a guide 9 with a light aperture window 10. The lamp 4 applies light through a condenser 5 through the aperture 8, if the same is aligned with the light window. The light passes through the aperture 8, is focussed in a lens 11 and passes through a light guide 12 practically without loss to the copying slot 3. The width of the light outlet area 13 at the front end of the light guide 12, adjacent the copying slot 3 is substantially equal to a frame intersection and amounts to about 3 mm.

The operation of the apparatus is as follows: Every aperture 7, 8 corresponds to one scene so that during the passage of one scene over the track 2 of the copying frame 1, the light flows continuously with an intensity given by the aperture 8 through the lens 11 and the light guide 12 to the copying slot 3. With a change of scene in the film, the light intensity must also be changed, that is, another aperture must be used in the window 10 of the guide 9. This can be effected only on pulling the aperture tape 6 downwards so that the aperture 8 is replaced by an aperture 7 in the window 10. The movement of the tape 6 may be effected by any known means. For example, the negative of the film may be marked at the point of the scene change, causing the advance of the tape 6 by known means, so that every change of scene advances the tape 6 under the control of the film negative. The switching member for the tape 6 may be a Maltese Cross drive, known to the art, having the maximum transportation speed in the centre position, and being therefore used almost exclusively for intermittent aperture tape transport.

Figure 2:
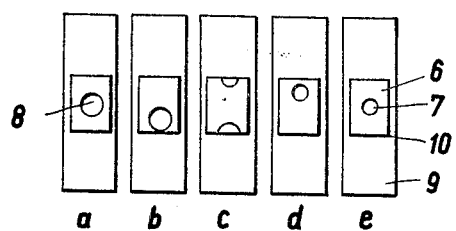
FIG. 2 is a representation of the individual phases of the switching step of the control tape during the passage through the light aperture.

FIG. 2 shows the advance of the tape 6 in five stages of the switching step a–e. FIG. 2a corresponds to FIG. 1 in which the tape 6 is so in the guide 9 that the aperture 8 is at rest within the window 10. With a scene change, the tape 6 is pulled downwards. FIG. 2b shows that the aperture 8 moves downwards, and the light emitted by the lamp 4 is incident through the aperture 8 on the lens 11 and thus on the copying slot 3 so long as the aperture 8 is within the window 10 of the guide 9. FIG. 2c shows the centre position of the switching step, in which one half of the aperture 8 has left the window 10. Since the width of the aperture 10 corresponds to the centre distance between two apertures 7 and 8, in this position, the upper half of the leaving aperture 8 and the lower half of the entering aperture 7 are within the window 10 so that light passes through these two halves through the lens 11 and the light guide 12 to the copying slot 3. As described above, in this position of the tape 6, the intersection between two frames passes the copying slot, so that the position of FIG. 2c coincides with the passage of the frame intersection and the light passing in this position through the light window 10 is not used; in this way, the least favourable centre position is eliminated. FIG. 2d shows the entering aperture 7 already fully in the window 10 so that the copying light required for the next scene is available fully through the window 10, the lens 11, the light guide 12 to the copying slot 3. This constant copying light, regulated by aperture 7, is applied to the copying slot 3 so long as the aperture 7 is within the window 10. FIG. 2e shows the setting of the tape 6 after terminated change-over. With a new change of scene, the tape 6 is pulled from the FIG. 2e position downwards, as already described until a further aperture 7,8 is in the centre of the window 10.

Due to this arrangement of the light window 10 associated with the lens 11 and the light guide 12, also during the advance of the tape 6 to a subsequent aperture 7, 8, the light flux is never interrupted, so that the copying slot 3 is continuously supplied with light. Since the least favourable centre position is not affected due to the simultaneous passage of the frame intersection through the copying slot, there result no undesirable fluctuations in the light or colour values affecting the film.

In the above, the invention has been described with reference to an optical arrangement, operating with an aperture tape. Other tapes may also be used, with the same advantage, such as transparent control tapes, as decribed above.

What we claim is:

A method of copying a continuous strip of film having image-bearing frames separated from each other by a small space comprising concentrating light from a constant light source into an area not wider than the space between frames, continuously moving the film and photosensitive copy material past the area for copying the image of the film on photosensitive copy material, directing a substantially opaque control tape, having a plurality of apertures of varying size defined at spaced locations along the length thereof through a path intersecting the light from the light source, and shifting said control tape for varying the aperture size aligned with the light source and thus the light to said area in accordance with the scene on the film to be copied in timed relationship to the film advance in a manner to provide a continuous beam of light to the area through a selected aperture at times when the image-bearing film is adjacent the area and to intercept the light with the opaque portion of the control tape only when the space between frames of the film is aligned with the area.

References Cited by the Examiner

UNITED STATES PATENTS

| | | | |
|---|---|---|---|
| 1,676,600 | 7/1928 | Capstaff | 88—24 |
| 1,957,864 | 5/1934 | Tuttle et al. | 96—27 |
| 2,080,463 | 5/1937 | Dalotel | 88—24 |
| 2,117,727 | 5/1938 | Jones | 95—75 |
| 2,243,048 | 5/1941 | Foster | 95—75 |
| 2,328,418 | 8/1943 | Brewster | 95—27 |
| 2,711,121 | 6/1955 | Barsam | 95—75 |
| 2,927,503 | 3/1960 | Zollinger | 88—24 |

JOHN M. HORAN, *Primary Examiner.*

A. E. TANENHOLTZ, *Assistant Examiner.*